(12) United States Patent
Poliquin

(10) Patent No.: US 6,199,336 B1
(45) Date of Patent: Mar. 13, 2001

(54) METAL WALL FRAMEWORK AND CLIP

(75) Inventor: Raymond Edward Poliquin, Newport Beach, CA (US)

(73) Assignee: California Expanded Metal Products Company, City of Industry, CA (US)

( * ) Notice: Subject to any disclaimer, the term of this patent is extended or adjusted under 35 U.S.C. 154(b) by 0 days.

(21) Appl. No.: 09/268,509

(22) Filed: Mar. 11, 1999

(51) Int. Cl.[7] .................................................. E04B 2/30
(52) U.S. Cl. .................. 52/489.1; 52/481.1; 52/481.2; 52/483.1; 52/690; 52/731.1; 52/731.7; 52/261; 52/731.9; 52/733.3; 52/653.1; 52/655.1
(58) Field of Search ........................... 52/241, 281, 481.1, 52/481.2, 653.1, 653.2, 655.1, 633, 664, 667, 712, 713, 733.2, 731.3–731.5, 731.7–731.9, 731.1, 732.2, 733.3, 736.2, 656.1, 656.9, 690, 696, 469.1, 463.1

(56) References Cited

U.S. PATENT DOCUMENTS

| | | |
|---|---|---|
| 2,910,151 | 10/1959 | Millstine . |
| 3,103,263 | 9/1963 | Leeser . |
| 3,216,160 | 11/1965 | Best . |
| 3,831,338 | 8/1974 | Klingensmith et al. . |
| 3,948,011 * | 4/1976 | Price et al. ............................. 52/241 |
| 4,075,810 * | 2/1978 | Zakrezewski et al. ................. 52/585 |
| 4,177,968 * | 12/1979 | Chapman ............................. 249/211 |
| 4,693,047 | 9/1987 | Menchetti . |
| 4,805,364 | 2/1989 | Smolik . |
| 4,918,893 | 4/1990 | Vandenbroucke et al. . |
| 4,932,173 | 6/1990 | Commins . |
| 5,058,354 * | 10/1991 | Menchetti ............................. 52/486 |
| 5,060,441 | 10/1991 | Pichette . |
| 5,157,883 | 10/1992 | Meyer . |
| 5,394,665 | 3/1995 | Johnson . |
| 5,457,928 | 10/1995 | Sahnazarian . |
| 5,481,844 | 1/1996 | Kajita . |
| 5,483,777 * | 1/1996 | Menchetti et al. ................... 52/481.1 |
| 5,596,859 | 1/1997 | Horton et al. . |
| 5,664,392 | 9/1997 | Mucha . |
| 5,669,198 | 9/1997 | Ruff . |
| 5,729,945 * | 3/1998 | Menchetti et al. ................... 52/481.1 |
| 5,797,694 | 8/1998 | Breivik . |
| 5,904,023 | 5/1999 | diGirolamo et al. . |

* cited by examiner

*Primary Examiner*—Carl D. Friedman
*Assistant Examiner*—Yvonne M. Horton
(74) *Attorney, Agent, or Firm*—Knobbe, Martens, Olson & Bear, LLP

(57) ABSTRACT

A wall framework includes top and bottom tracks, a horizontal channel and vertical studs. A first vertical stud is secured to the top track and the bottom track and has a first opening sized and shaped to permit the horizontal channel to extend therethrough and a second opening vertically spaced from the first opening. A second vertical stud is secured to the top track and the bottom track and has a third opening sized and shaped to permit the channel to extend therethrough and a fourth opening vertically spaced from the fourth opening. At least one clip extends through the first opening and the second opening. A fastener connects the horizontal channel to the clip. The clip cooperates with the fastener to secure the horizontal channel in a fixed relationship to the first vertical stud.

11 Claims, 4 Drawing Sheets

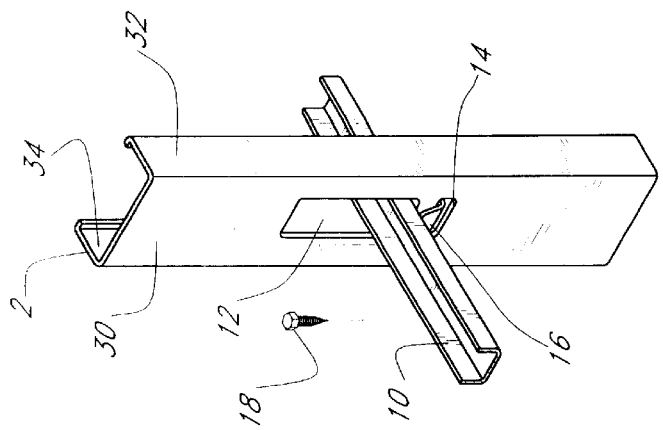
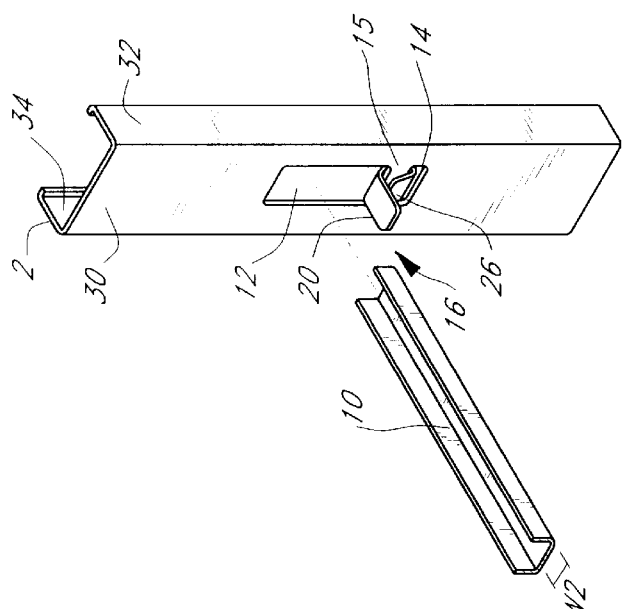
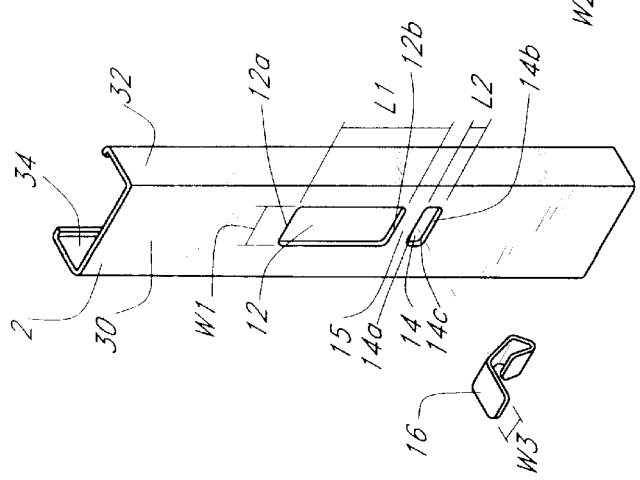

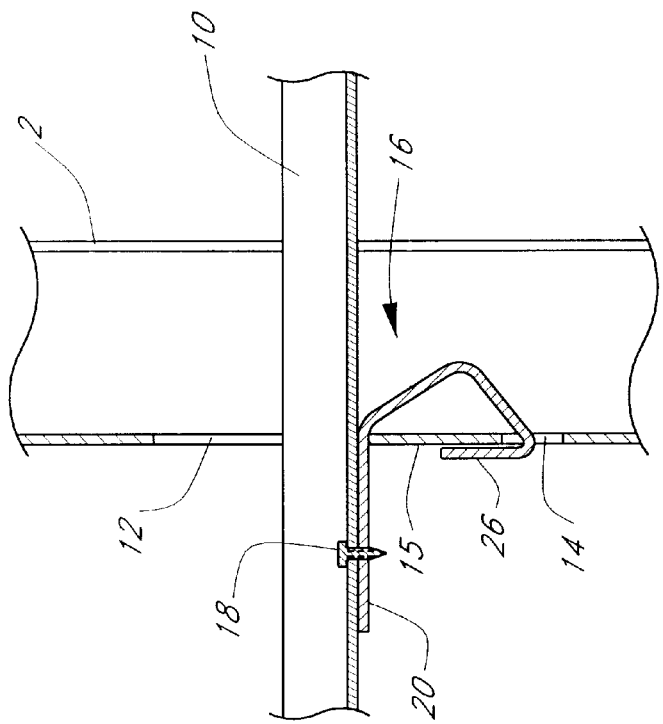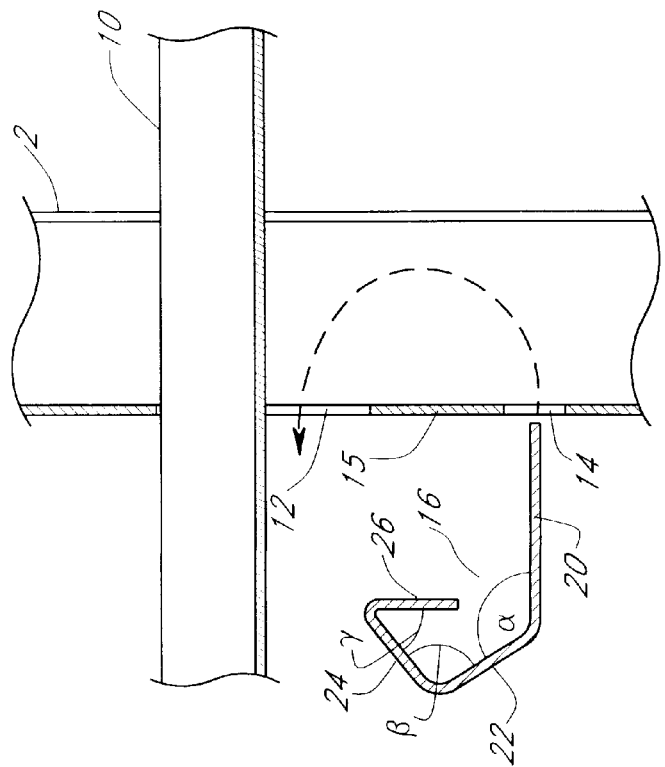

METAL WALL FRAMEWORK AND CLIP

BACKGROUND OF THE INVENTION

1. Field of the Invention

The present invention relates to a wall framework. More particularly, the present invention relates to a wall framework including a horizontal channel which reinforces the wall framework. Furthermore, the invention relates to a method of making a reinforced wall framework and a method of forming a clip for a wall framework.

2. Description of the Related Art

Wall frameworks are used within commercial and residential buildings, for example, for bearing and non-bearing interior and exterior wall constructions. Each wall framework includes a variety of vertical studs secured by top and bottom tracks to the ceiling and the floor, respectively, of a room or office. The studs are typically steel. The wall framework may further include one or more horizontal channels which are assembled with the wall framework to stabilize the wall framework. Before the erected wall framework is covered with dry wall construction panels, insulation material such as fiberglass is typically fitted into the space between the studs.

The horizontal channels connect the studs and bridge the wall framework. Such a bridging improves the framework's resistance to flexural and torsional-flexural buckling which occurs in metal stud frames under wind and axial loads. Flexural buckling is the term used to describe buckling of a stud generally perpendicular to its longitudinal axis. Torsional-flexural buckling is the term used to describe the twisting of a stud about its longitudinal axis.

Usually, a structural engineer determines the spacing requirement for the bridging based on actual loads the framework must support. The spacing of the bridging can be set to any distance as long as the allowable loads and spans are set accordingly. For instance, if the spacing increases the allowable loads should be reduced. Manufactures and suppliers of studs and framework equipment typically provide catalogs including tables listing the spacings and corresponding allowable spans and loads.

In addition to these spacing and bridging requirements, there are different bridging requirements for bearing walls and non-bearing walls. The 1994 Uniform Building Code defines load-bearing wall as any metal or wood stud wall which supports more than 100 pounds per linear foot of superimposed load.

Metal studs used in the wall frameworks typically have a generally C-shaped cross section. Each stud has several cut-outs which are spaced apart at regular intervals to accommodate electrical cables or plumbing equipment. The horizontal channels may also extend through the cut-outs in the studs. At each cut-out the horizontal channel is secured to the stud, for example, by means of an angle iron which is fastened to the stud and the horizontal channel by means of several screws (e.g., 3–4 screws) or welding. This method, however, is tedious and time consuming which, therefore, increases labor costs. Labor costs are an important factor in the overall costs for the building, whereas the costs for material are relatively constant within a certain range. Architects and contractors, thus, have a strong interest to keep the labor costs as low as possible.

An exemplary wall framework is disclosed in U.S. Pat. No. 4,693,047. The wall framework consists of vertical studs of sheet metal and horizontal channels. The studs have several openings or cut-outs through which the horizontal channels extend. Each opening has a pair of bendable sheet metal tabs formed at the sides of the upper portion of the opening. The tabs lock the horizontal channel in the bottom portion of each opening when bent inwardly. Although the horizontal channel is secured to the studs without fasteners such as screws, it is still time consuming because at each opening a worker needs to bend two metal tabs. Further, it appears that the tabs are sharp-edged posing a risk of injury to the worker.

SUMMARY OF THE INVENTION

There is, therefore, a need for an improved wall framework particularly adapted to be erected in a minimum amount of time. In particular, there is a need to improve the attachment of the horizontal channel to the vertical stud.

One aspect of the invention involves a wall framework. The wall framework includes a top track, a bottom track, a horizontal channel and vertical studs. A first vertical stud is secured to the top track and the bottom track and has a first opening sized and shaped to permit the horizontal channel to extend therethrough and a second opening vertically spaced from the first opening. A second vertical stud is secured to the top track and the bottom track and has a third opening sized and shaped to permit the channel to extend therethrough and a fourth opening vertically spaced from the fourth opening. At least one clip extends through the first opening and the second opening. A fastener connects the horizontal channel to the clip. The clip cooperates with the fastener to secure the horizontal channel in a fixed relationship to the first vertical stud.

A further aspect of the invention involves a clip for use with a wall framework. The wall framework includes a first vertical stud defining a first opening and a second opening separated by a span defining an outer surface, an inner surface and a connecting surface. The connecting surface extends between the inner surface and the outer surface and defines a portion of the first opening. The clip has a body configured to extend through the first and second openings. The body includes a support portion, a connecting portion and a locking portion. The locking portion defines a first mating surface positionable against the first support surface of the first stud, and the connecting portion defines a second mating surface positionable against the connecting surface of the stud and the support portion defining a fastening surface.

Another aspect of the invention involves a method of making a reinforced wall framework. A stud is provided. defining a first opening and a second opening separated by a connecting span. A clip is inserted through the first opening and the second opening so that the clip simultaneously extends through the first opening and the second opening. A reinforcing beam is inserted through the first opening and fastened to the clip. The stud, the clip, the fastener and the reinforcing beam cooperate to maintain the stud and the reinforcing beam in a fixed relationship.

A further aspect of the invention involves a method for forming a clip for a metal wall framework. A provided flat metal strip of substantially rectangular shape is bent at a first predetermined location to create a front portion and a rear portion. The rear portion extends from the front portion at a first angle. The rear portion is bent at a second predetermined location to create a first section and a second section. The first and second sections form a second angle between them. The rear portion is bent at a third predetermined location to create a third section extending from the second section at a third angle, wherein the front portion and the third portion are transverse to each other.

BRIEF DESCRIPTION OF THE DRAWINGS

The foregoing features and other features of the present invention will now be described with reference to the drawings of a preferred embodiment of a wall framework. In the drawings, the same components have same the reference numerals. The illustrated embodiment is intended to illustrate, but not to limit the invention. The drawings include the following figures:

FIG. 2A shows an embodiment of a section of a stud and a clip in accordance with the present invention;

FIG. 2B shows the clip attached to the section of the stud, and a section of a horizontal channel;

FIG. 2C shows the horizontal channel secured to the stud;

FIG. 3A illustrates exemplary the insertion of the clip into openings of the stud;

FIG. 3B illustrates an embodiment of the inserted clip; and

DETAILED DESCRIPTION OF THE PREFERRED EMBODIMENT

Figure 1:
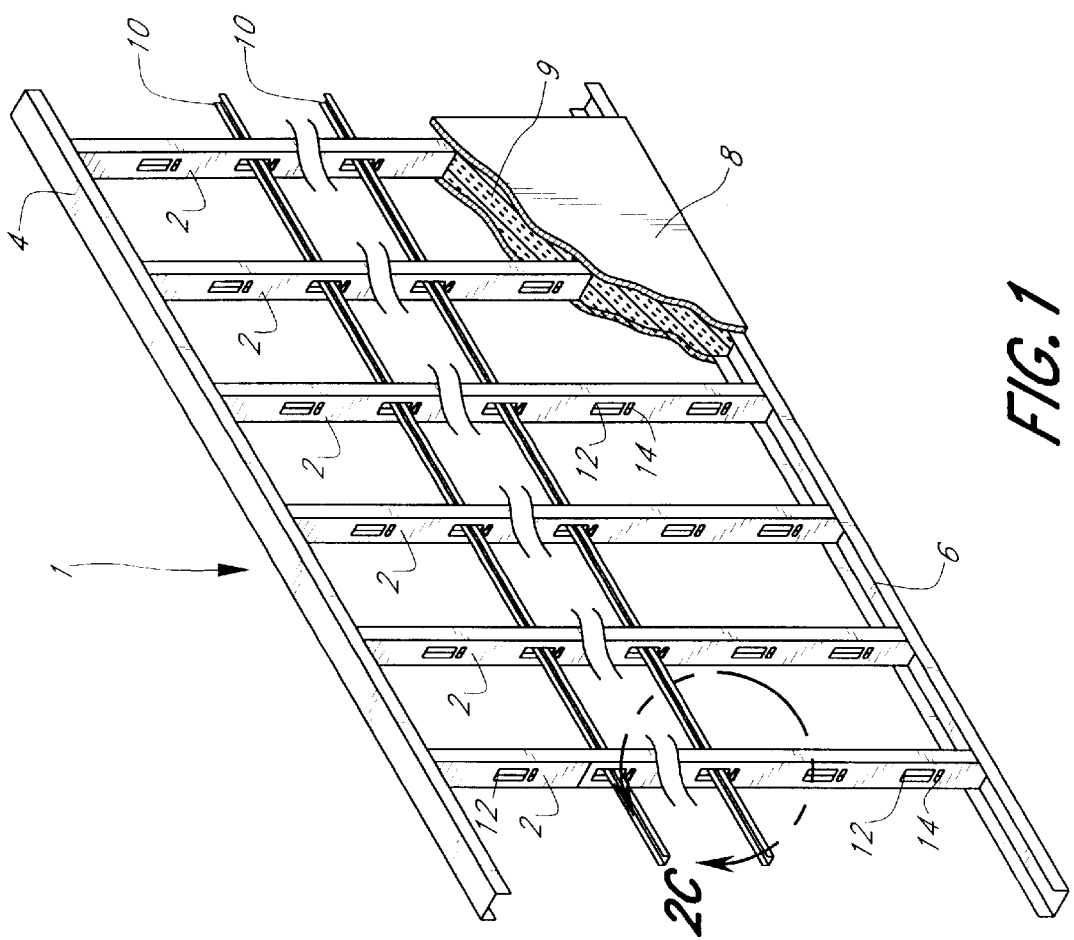
FIG. 1 shows an embodiment of a wall framework.

FIG. 1 shows an exemplary embodiment of a wall framework 1, which can be used in commercial and residential buildings. For instance, the wall framework 1 may form an interior wall of a single or multiple floor building. Vertically, the wall framework 1 extends between the floor and the ceiling and horizontally, for example, between two interior walls of the building. As will be appreciated, the wall framework 1 can form part of a bearing wall or a non-bearing wall.

The wall framework 1 is on both sides covered by a dry wall panelling 8 or other wall board typically used in such buildings. In one embodiment, the space between the dry wall panelling 8 is desirably filled with an insulation material 9 such as fiberglass or panels of foam material. The wall framework 1 has in one embodiment a thickness of about 6 inches (about 0.15 meters).

The illustrated wall framework 1 includes a plurality of vertical studs 2 and two horizontal channels 10. The vertical studs 2 are spaced apart at a predetermined distance, for example, at a distance of 12, 16 or 24 inches. The bridging distance between two studs 2 is determined by various parameters such as the load the wall framework 1 must support. For example, the bridging distance of a bearing wall is different from the bridging distance of a non-bearing wall. For loads of lesser magnitude, the bridging distance can be increased. Similarly, for loads of a higher magnitude, the bridging distance can be decreased. The studs 2 are secured to the floor by means of a track 6 and to the ceiling by means of a track 4.

In one embodiment, both tracks 4, 6 have generally C-shaped cross sectional profiles. The C-shaped cross sectional profile of each track 4, 6 has a base and two sidewalls. The base of the track 4 faces the ceiling, and the base of the track 6 faces the floor. The tracks 4, 6 receive the studs 2 between the sidewalls. The studs 2 can be connected to the tracks 4, 6 in a conventional manner, for example, by means of fasteners which provide a releasable connection or by means of welding, which provides a permanent connection.

In one embodiment, the studs 2 are steel studs having generally C-shaped cross sectional profiles as shown in FIGS. 2A–2C. Each stud 2 defines several groups of cut-outs. Each group of cut-outs includes two individual cut-outs 12, 14 of different sizes The cut-out 12 has a generally rectangular shape and extends parallel to and, preferably, coaxially with a longitudinal axis A (FIG. 2B) of the stud 2. The cut-out 12 is sized to permit the horizontal channel 10 to extend therethrough. Preferably, however, the cut-out 12 has a width W1 (FIG. 2A) only slightly larger than a width W2 (FIG. 2B) of the horizontal channel 10. The cut-out 14, which is smaller than the cut-out 12, has also a generally rectangular shape, but extends transversely to the axis A of the stud 2. The cut-out 14 is sized to permit insertion of a clip 16 having a width W3 (FIG. 2A). In one embodiment, the cut-out 14 has a width that is substantially equal to the width W1. Further details of the cut-outs 12, 14 are described below with reference to FIGS. 2A–2C.

It is contemplated that the studs 2 will have properties such as material thickness, yield strength, tensile strength and galvanized coating and ductility which are suitable for frameworks used within commercial and residential buildings. These properties may be, for example, defined by or derived from the Uniform Building Code. In the illustrated embodiment of the studs 2, the groups of cut-outs 12, 14 are equally spaced apart at a predetermined center-to-center distance which is not less than 24 inches. Preferably, the cut-outs 12 are spaced apart at a distance of about 24 inches on center and the cut-outs 12 next to the ends of the stud 2 are typically not closer than 12 inches from the ends. Equal spacing of the cut-outs 12 is desirable for ease of construction. However, it is contemplated that the spacing of the groups of cut-outs 12, 14 could vary, or that each stud 2 may have only one group of cut-outs 12, 14. As explained below, the cut-outs 14 assist in securing the horizontal channel 10 to the studs 2.

The cut-outs 12 of the studs 2 are positioned at predetermined heights so that each channel 10 extends substantially horizontal through the cut-outs 12. Since each stud 2 has several cut-outs 12 at different heights, the horizontal channels 10 can be located at different heights. Although FIG. 1 shows two horizontal channels 10, it is contemplated that the wall framework 1 can include only one horizontal channel 10 or more than two horizontal channels 10 located at different heights. The number of horizontal channels 10 depends, for example, on the location of the wall framework 1 within the building and on how much load the wall framework 1 has to support. For instance, in case the wall is a bearing wall, two or more horizontal channels 10 can be used to strengthen the wall framework 1.

The securement of the horizontal channel 10 to the stud 2 is illustrated in FIGS. 2A, 2B, 2C. These FIGS. 2A, 2B, 2C show a section of the horizontal channel 10 and a section of the stud 2 defining one group of the cut-outs 12, 14. A clip 16, in combination with the cut-outs 12, 14, secures the horizontal channel 10 to the stud 2.

Referring to FIG. 2A, the generally C-shaped profile of the stud 2 and the generally rectangular shapes of the cut-outs 12, 14 are visible. The stud 2 has a web or base portion 30 and two side portions 32, 34 which extend from the outer sides of the base portion 30 at an angle of about 90°. Thus, the stud 2 has an inner surface (the "inside") and an outer surface (the "outside".)

The base portion 30 may advantageously have a width from 1⅝ to 12 inches. Preferably, the width of the base portion 30 may be about 3–8 inches. Other widths may be 3⅝, 4 and 6 inches. Preferably, the side portions 32, 34 (flanges) have a length from about 1½ to 3 inches. In one preferred embodiment, the length of the side portions 32, 34 is about 1.5 inches.

As it is known in the art, the cut-outs 12, 14 can be punched out in a conventional manner. Punching the cut-outs 12, 14 is faster than cutting and requires little or no finishing work. Because the cut-outs 12, 14 are punched out, the corners of the cut-outs 12, 14 are rounded.

In the illustrated embodiment, the rectangular shape of the cut-out 12 is defined by a top edge 12a, a bottom edge 12b and two lateral edges 12c. The cut-out 12 can be of a standard size typically used in studs 2. The rectangular shape of the cut-out 14 is defined by a top edge 14a, a bottom edge 14b and two lateral edges 14c. Desirably, the sizes of the cut-outs 12, 14 are selected to avoid significant weakening of the studs 2.

In a standard cut-out 12, the width W1 does not exceed 2½ inches and the height L1 does not exceed 4½ inches. In one embodiment, the cut-out 12 has a width W1 between about 1–2 inches and a height L1 between about 3–4 inches and, preferably, W1=1.5 inches and L1=3.75 inches. The cut-out 14 can have the same width as the cut-out 12, but a height L2 between about 0.2–0.5 inches and, preferably, L2=0.375 inches. The cut-outs 12, 14 are separated by a span 15 and are spaced apart between about 0.2–1.0 inches and, preferably, about 0.375 or 0.4 inches. The studs 2 having such sized cut-outs 12, 14 are sufficiently resilient to provide sufficient strength of the wall framework 1.

The span 15 defines an outer surface which serves as a support surface, an inner surface and an upper first and a lower second connecting surface extending between the inner surface and the outer surface. The first connecting surface corresponds to the bottom edge 12b of the cut-out 12. The second connecting surface corresponds to the top edge 14a of the cut-out 14.

The clip 16 is a multiple-angled metal strip sized to extend through the cut-outs 12, 14. Structural details of the clip 16 are described below in connection with FIGS. 3A and 3B. Preferably, the width W3 of the clip 16 is only slightly smaller than the width W1 of the cut-outs 12, 14. The widths W1, W3 are selected so that the clip 16 can be easily inserted and does not fall out after a worker has positioned it.

Advantageously, the clip 16 is self-securing so that no additional support or fastening is required. This permits the worker to position the required clips 16 in a fast and reliable manner without assistance from another worker. In addition, by using the clip 16 (width W3) with a stud 2 (width W1), wherein the width W3 is about equal to the width W1, one can ensure that the clip 16 will be secured snugly to the stud 2. However, it is contemplated that the clip 16 may be used with any size of stud 2 and with cut-outs 12, 14 having widths W3 which are slightly larger than the width W1 of the clip 16.

FIGS. 2B and 3B show the clip 16 attached to the stud 2. The clip 16 extends through both cut-outs 12, 14. A front portion 20 of the clip 16 extends substantially perpendicular to the axis A of the stud 2, and a rear end 26 of the clip 16 extends substantially parallel to the axis of the stud 2 and transverse (preferably orthogonal) to the front portion 20. The clip 16 is shaped so that the rear end 26 presses against the span 15 when a force is applied to the front portion 20, while the front portion rests on the bottom edge 12b of the cut-out 12.

It is an advantage of the clip 16, sized as described above, that the weight of the front portion 20 is sufficient to press the rear end 26 against the span 15. This allows one to attach and to position the clip 16 without any fasteners in an easy and time-saving manner. In particular, the clips 16 can be attached to all studs 2 of the wall framework 1 before the horizontal channel 10 is passed through the cut-outs 12.

It is contemplated that the clips 16 can also be attached after the horizontal channel 10 is passed through the cut-outs 12.

As shown in FIGS. 2C and 3B, after the clip 16 is attached, the horizontal channel 10 extends through the cut-out 12, and the horizontal channel 10 rests upon the front portion 20 of the clip 16. The horizontal channel 10 is secured to the clip 16 by means of a fastener 18. Advantageously, the fastener 18 is a screw and, preferably, a self-drilling screw. Alternatively, a nut and bolt or welding can be used.

FIGS. 3A, 3B show side views of the clip 16, the sections of the stud 2 and the horizontal channel 10. FIG. 3A illustrates a situation in which the horizontal channel 10 is already positioned and extends through the cut-out 12 before the clip 16 is attached to the stud 2.

Desirably, the clip 16 is a multiple-angled metal strip having a gauge selected to provide sufficient strength and resilience to resist tension, shear and torsional forces. In addition to these requirements, the clip 16 should be bendable and desirably manufacturable at low costs.

The clip 16 is angled so that the front portion 20 and the rear end 26 are substantially orthogonal to each other. A connecting portion 22, 24 connects the rear end 26 and the front portion 20. The front portion 20 defines a support portion having a fastening surface 20a and the rear end 26 defines a locking portion having a first mating surface 26a. The connecting portion 22, 24 defines a second mating surface 22a which is positionable against the connecting surface 12b of the stud 2.

Independent of how often the clip 16 is bent, the sum of the angles is desirably approximately 270 degrees. In one embodiment, the clip 16 has three (inner) angles. The clip 16 comprises the front portion 20 and a rear portion which extends from the front. portion, for example, at an angle α of about 128 degrees. The rear portion includes two middle sections 22, 24, and the rear end 26. In the illustrated embodiment, the middle sections 22, 24 form an angle β of about 90 degrees, and the middle section 24 and the rear end 26 form an angle γ of about 51 degrees.

In the illustrated embodiment, the front portion 20 has a length of about 1.6 inches. The middle sections 22, 24 each have a length of about 0.6 inches, and the rear end 26 has a length of about 0.4 inches. As indicated in FIG. 3A, the front portion 20 of the clip 16 is first passed from the outside of the stud 2 through the cut-out 14 into the inside of the stud 2. Then, the front portion 20 of the clip 16 is passed from the inside of the stud 2 through the cut-out 12 to the outside of the stud 2.

FIG. 3B shows a situation in which the 16 and the horizontal channel 10 are positioned and secured by means of the fastener 18. The front portion 20 extends parallel to the horizontal channel 10 and transverse to the rear end 26. The rear end 26 is parallel to and presses against the span 15.

It is a particular advantage of the present invention that no screws are necessary to attach the clip 16 to the stud 2. The clip 16 is easily inserted to and positioned within the cut-outs 12, 14 so that no time-consuming attaching of the clip 16 to the stud 2 is required. A single screw 18 connects the clip 16 and the horizontal channel 10. Advantageously, this screw 18 can conveniently be attached from above the horizontal channel 10. An additional advantage which contributes in increasing the productivity is that no clamping of the clip 16 and the stud 2 is required while a worker installs the screw 18.

Based on an analysis by the applicant, the described clip 16 provides for substantial reductions in labor costs compared to welding of the horizontal channel 10 or attaching the horizontal channel 10 with an angle detail as described in the "Background of the Invention" section above. Table 1 shows quantitative results of the analysis.

TABLE 1

| Installation Type | Labor Rate Per Day | Average Production | Labor Costs Per Installation | Change by use of Preferred Clip |
|---|---|---|---|---|
| Welding | $35 × 8 hrs = $280 | 150 Installations/Day | $1.87 | 57% Reduction |
| Angle Detail | $15 × 8 hrs = $120 | 100 Installations/Day | $1.20 | 34% Reduction |
| Preferred Clip | $15 × 8 hrs = $120 | 150 Installations/Day | $0.80 | — |

As discussed above, prior art solutions secure the horizontal channel through welding or a combination of an angle detail and screws. Welding is usually done by skilled and certified workers who have an average production of about 150 installations per day. As shown in Table 1, the labor costs for welding are then approximately $1.87 per installation.

Angle details and the preferred clip 16 can be attached by unskilled workers. The workers have an average production of about 100 installations per day when angle details are used. As shown in Table 1, the labor costs for attaching the angle details are then approximately $1.20 per installation. When clips 16 are used, the workers have an average production of 150 installations per day. Thus, the labor costs for attaching the clip 16 are approximately $0.80 per installation (Table 1).

As shown in Table 1, using the clip 16 provides for a 34% reduction in labor costs compared to the installation of an angle detail. An even higher labor cost reduction is achieved compared to welding. The clip 16 provides for a 57% reduction in labor costs with respect to a welding installation.

Welding requires very little material compared to the other two installation options. However, those skilled in the art will appreciate that the anticipated dramatic reductions in labor costs should easily outweigh any higher material costs when the preferred clip 16 is used.

Figure 4:
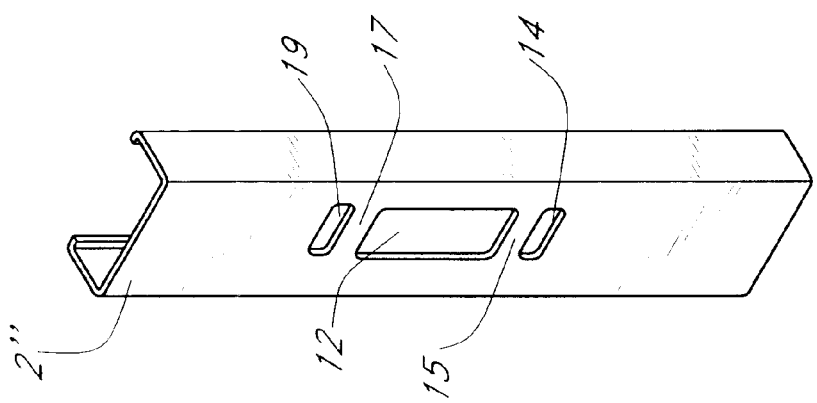
FIG. 4 shows an alternative embodiment of a stud.

FIG. 4 shows a possible alternative embodiment of a stud 2'. In addition to the cut-outs 12, 14, the stud 2' defines a further cut-out 19 which has the same size as the cut-out 14. With reference to an erected stud 2 (e.g., FIG. 1), the cut-out 14 is located below the cut-out 12, and the cut-out 19 is located above the cut-out 12. A span 17 separates the cut-out 19 from the cut-out 12. Advantageously, the stud 2' can be used in either orientation. Thus, workers do not have to pay attention how the stud 2' is oriented within the wall framework 1.

Although this invention has been described in terms of certain preferred embodiments, other embodiments that are apparent to those of ordinary skill in the art are also within the scope of this invention. Accordingly, the scope of the invention is intended to be defined by the claims that follow.

What is claimed is:

1. A wall framework, comprising:
    a top track;
    a bottom track;
    a horizontal channel;
    a first vertical stud secured to the top track and the bottom track and having a first opening sized and shaped to permit the horizontal channel to extend therethrough and a second opening vertically spaced from the first opening;
    a second vertical stud secured to the top track and the bottom track and having a third opening sized and shaped to permit the channel to extend therethrough and a fourth opening vertically spaced from the fourth opening; and
    at least one clip extending through the first opening and the second opening;
    a fastener connecting the horizontal channel to the clip, the clip cooperating with the fastener to secure the horizontal channel in a fixed relationship to the first vertical stud.

2. The wall framework of claim 1, wherein the first vertical stud further comprises a span between the first opening and the second opening, the span defining a first support surface, and wherein the first opening has a lower horizontal surface.

3. The wall framework of claim 2, wherein the clip comprises a first mating surface positioned against the first support surface of the first stud, and a second mating surface positioned against the horizontal surface of the first stud.

4. The wall framework of claim 1, wherein the first and third openings have substantially rectangular shapes extending longitudinally to a longitudinal axis of each stud, and wherein the second and fourth openings have substantially rectangular shapes extending transversely to the longitudinal axis of each stud.

5. The wall framework of claim 1, wherein the first and third openings each have a height of about 3–4 inches and a width of about 1–2 inches.

6. The wall framework of claim 5, wherein the first and third openings each have a height of about 3.75 inches and a width of about 1.5 inches.

7. The wall framework of claim 1, wherein the second and fourth openings each have a height of about 0.2–0.5 inches and a width of about 1–3 inches.

8. The wall framework of claim 7, wherein the second and fourth openings each have a height of about 0.37 inches and a width of about 1.5 inches.

9. The wall framework of claim 1, wherein each stud has a generally C-shaped cross section.

10. The wall framework of claim 1, wherein the studs, the horizontal channel and the at least one clip are made of metal.

11. A method of making a reinforced wall framework, comprising:
    providing a stud defining a first opening and a second opening separated by a connecting span;
    inserting a clip through the first opening and the second opening so that the clip simultaneously extends through the first opening and the second opening;
    inserting a reinforcing beam through the first opening;
    fastening the reinforcing beam to the clip, whereby the stud, the clip, the fastener and the reinforcing beam cooperate to maintain the stud and the reinforcing beam in a fixed relationship.

* * * * *